US012667033B2

(12) United States Patent
Heitlinger et al.

(10) Patent No.: US 12,667,033 B2
(45) Date of Patent: Jun. 30, 2026

(54) COUPLING DEVICE FOR A LOWER LINK OF A THREE-POINT LINKAGE

(71) Applicant: DEERE & COMPANY, Moline, IL (US)

(72) Inventors: Martin Heitlinger, Oestringen (DE); Mario Patino, Ludwigshafen (DE)

(73) Assignee: DEERE & COMPANY, Moline, IL (US)

( * ) Notice: Subject to any disclaimer, the term of this patent is extended or adjusted under 35 U.S.C. 154(b) by 310 days.

(21) Appl. No.: 18/558,031

(22) PCT Filed: May 5, 2022

(86) PCT No.: PCT/EP2022/062170
§ 371 (c)(1),
(2) Date: Oct. 30, 2023

(87) PCT Pub. No.: WO2022/248186
PCT Pub. Date: Dec. 1, 2022

(65) Prior Publication Data
US 2024/0244986 A1     Jul. 25, 2024

(30) Foreign Application Priority Data

May 25, 2021     (DE) .......................... 102021113462.5

(51) Int. Cl.
*A01B 59/043*     (2006.01)
*A01B 59/00*     (2006.01)
*A01B 59/06*     (2006.01)

(52) U.S. Cl.
CPC .......... *A01B 59/006* (2013.01); *A01B 59/043* (2013.01); *A01B 59/062* (2013.01);
(Continued)

(58) Field of Classification Search
CPC . A01B 59/008; A01B 59/043; Y10T 403/593; Y10T 403/602; B60D 1/065; A01D 67/005
See application file for complete search history.

(56) References Cited

U.S. PATENT DOCUMENTS 2,166,208 A * 7/1939 Dayton .................. B60D 1/065
                                                    280/513
2,523,500 A * 9/1950 Davey .................... B60D 1/065
                                                    280/513

(Continued)

FOREIGN PATENT DOCUMENTS

DE          2749311 A1     5/1979
DE          2944452 B1     4/1981
EP          1111984 B1     6/2004

OTHER PUBLICATIONS

International Search Report issued in application No. PCT/EP2022/062170, dated Sep. 1, 2022, 1 page.

*Primary Examiner* — Michael P Ferguson

(57)     ABSTRACT

A coupling device for a lower link of a three-point linkage, including a coupling body with a catch hook for receiving a coupling element along a defined receiving direction, the coupling element being designed to complement a fastening region of the catch hook, and also including a locking mechanism with a locking latch, which is urged by a spring force into a locking position, in which the catch hook is locked, in which case a coupling element to be received by the fastening region can be arrested in the catch hook. The locking latch here is longitudinally displaceably mounted in a sliding guide, provided on the coupling body, such that it can be deflected out of the locking position exclusively perpendicularly to the defined receiving direction, thereby clearing the fastening region.

10 Claims, 4 Drawing Sheets

(52) U.S. Cl.
      CPC ......... *A01B 59/066* (2013.01); *Y10T 403/593*
                      (2015.01); *Y10T 403/602* (2015.01)

(56)                    References Cited

U.S. PATENT DOCUMENTS

| | | | | |
|---|---|---|---|---|
| 2,691,932 | A | 10/1954 | Sawyer | |
| 2,711,679 | A | 6/1955 | Kuhary | |
| 4,023,822 | A | 5/1977 | Geisthoff et al. | |
| 4,146,246 | A | 3/1979 | Geisthoff | |
| 4,147,374 | A | 4/1979 | Jeffes | |
| 5,129,667 | A | 7/1992 | Gratton | |
| 6,505,848 | B1 * | 1/2003 | Brown ................... | B60D 1/065 |
| | | | | 280/512 |
| 8,276,933 | B2 * | 10/2012 | Goettker ................ | B60D 1/065 |
| | | | | 280/511 |
| 8,342,559 | B1 * | 1/2013 | MacKarvich .......... | B60D 1/065 |
| | | | | 280/507 |
| 2005/0072582 | A1 | 4/2005 | Greenwell | |
| 2016/0128261 | A1 | 5/2016 | Figger | |

* cited by examiner

COUPLING DEVICE FOR A LOWER LINK OF A THREE-POINT LINKAGE

CROSS-REFERENCE TO RELATED APPLICATIONS

This application is a National Stage of PCT Application No. PCT/EP2022/062170, filed May 5, 2022, which claims the benefit of and priority to German Patent Application No. 102021113462.5, filed May 25, 2021, which are hereby incorporated by reference.

FIELD OF THE DISCLOSURE

The disclosure relates to a coupling device for a lower link of a three-point linkage.

BACKGROUND

Such lower link hooks are offered by various manufacturers and usually have a locking mechanism with a locking latch which engages in the catch hook in a sideways-upward direction and which can be moved into a coupling position that releases the catch hook against a restoring spring force when a coupling ball enclosed by an attachment interface is coupled in. As soon as the coupling ball has reached its end position, the locking latch snaps back into its original position, simultaneously locking the catch hook.

SUMMARY

In principle, there is the possibility that the coupling connection produced in this way may disengage itself under unfavorable conditions. This is especially true when, due to wear, an increased radial play occurs between the coupling ball on the one hand and the catch hook or the locking latch on the other hand, with the result that it is increasingly possible for the coupling ball, which is then "too small", to enter into the gap present between the locking latch and the catch hook and, in doing so, to push the locking latch aside. Additional measures are therefore provided to secure the coupling connection. These generally provide a bolt to be inserted through the lower link hook, which makes it possible to lock the locking mechanism. Experience has shown that an operator may forget to put the bolt in place after the completion of a coupling process, or that the bolt may get lost (without this being noticed).

It is therefore an object of the present disclosure to improve a coupling device of the type cited initially in respect of its handling.

This object is achieved by a coupling device having the features of one or more of the following embodiments.

The coupling device for a lower link of a three-point linkage comprises a coupling body with a catch hook for receiving a coupling element along a defined receiving direction, the coupling element being of complementary design to a fastening region of the catch hook, and comprising a locking mechanism with a locking latch, which is urged by a spring force into a locking position, in which the catch hook is locked, in which case a coupling element to be received by the fastening region can be retained in the catch hook. According to the disclosure, the locking latch is mounted in a longitudinally movable manner in a sliding guide, provided on the coupling body, in such a way that it can be deflected out of the locking position exclusively perpendicularly to the defined receiving direction, thereby clearing the fastening region, whereas the locking latch, when in the locking position, projects more than half way beyond the fastening region in the defined receiving direction, thereby performing a locking function.

If a coupling element configured as a coupling ball is situated in the fastening region, the locking latch accordingly extends beyond the apex, which faces the locking latch in the receiving direction.

In this way, the possibility that the locking latch will be pushed open as a result of the action of force of the coupling element can be largely ruled out. The locking mechanism thus formed therefore eliminates the need for separate securing measures by the operator.

The lower link is part of a conventional three-point linkage of an agricultural tractor. To be more precise, there are left and right lower links which run symmetrically with respect to one another and are each equipped with the coupling device according to the disclosure. The two lower links are articulated in a lower region of a rear-side differential housing of the agricultural tractor and can be raised and lowered via a hydraulic lifting mechanism at the instigation of an operator. If double-acting hydraulic cylinders are used to actuate the hydraulic lifting mechanism, it is also readily possible, by virtue of the above-described properties of the locking mechanism, to exert a downwardly directed force toward the ground, via the two lower links, on a tillage implement attached thereto. This is of note insofar as the catch hooks on the lower links open upward, and thus almost all of the applied force is exerted on the coupling elements of the attachment interface via the locking latches or locking mechanism.

Advantageous developments of the coupling device according to the disclosure can be found herein.

A flat contact contour, which faces the fastening region and, for example, runs parallel to the deflection direction of the locking latch, is formed on the locking latch. Such a contact contour offers a particularly small engagement surface for operational movements of a coupling element situated in the fastening region. In this way, the possibility that the locking latch will be pushed open in the event that the coupling element has increased bearing play within the fastening region can be further reduced.

Against this background, a projection, which fits over the fastening region, can additionally be provided along the flat contact contour as a mechanical obstacle.

Alternatively, a concave contact contour, which faces the fastening region and corresponds, for example, to an outer curvature of a coupling element to be received, can be formed on the locking latch. For example, this takes into account the case where the coupling element is a coupling ball. When the coupling ball is in contact with the concave contact contour, pushing open of the locking latch by the coupling ball is blocked by the rising flank of the concave contact contour.

To achieve a snap lock which simplifies the coupling process, it is furthermore possible that the locking latch is bevelled in such a way at an end lying in the receiving direction that it can be urged into a coupling position which clears the fastening region when the coupling ball is introduced.

The sliding guide can be formed within a housing provided on an upper side of the coupling body. The sliding guide can be a shaft-shaped recess extending in the housing, in which the locking latch is guided in a longitudinally movable manner along a slide-shaped section.

For example, the housing has a box-shaped configuration and is an integral part of the coupling body. For purposes of simpler production, such an integral design can also be limited to a housing shell which is formed on the coupling body, is open to the side and can be covered by welding on a separate housing cover. In this case, both the coupling body and the box-shaped housing are produced as steel forgings.

In order to be able to replace the locking latch as well as further components of the locking mechanism in the event of wear or a defect, it is conceivable for the housing to have an access opening, which can be closed via a removable maintenance cover. The locking mechanism is situated in the housing as an insert that can be pulled out along the sliding guide and can be removed as a whole from the housing when the maintenance cover is removed.

It is also possible that mutually aligned bores for receiving a securing bolt extend through opposing cheeks of the housing in such a way that a deflection of the locking latch out of the locking position can be blocked via the securing bolt. The securing bolt is usually a screw which, after being inserted, can be secured at its open end protruding from the housing via a nut.

In order to drain water penetrating into the locking mechanism, it is also possible for a drainage opening for drainage of liquid to be formed in the housing.

As a protection against damage to the locking mechanism, the sliding guide can have an elastic stop element for limiting a longitudinal movement of the locking latch in the direction of the locking position. The elastic stop element is, for example, an elastomer strip inserted into an internal housing groove.

Furthermore, a pull lever can be attached to the locking latch, via which the locking latch can be deflected manually out of the locking position by the operator. For this purpose, the pull lever or a hand piece formed thereon extends outward through a rear outlet opening provided on the housing. For example, the rear outlet opening can be formed in the abovementioned maintenance cover.

A latching device, via which the locking latch can be retained in a coupling position which clears the fastening region, can be formed on the pull lever. In one embodiment, the latching device is a recess which is formed along the pull lever and can be hooked in an edge of the rear outlet opening. The retention makes it possible to move both locking latches simultaneously into the coupling position, thus enabling the coupling elements of an attachment interface that is to be attached to the three-point linkage to be introduced more easily into the catch hooks at the same time.

In order to implement a simple type of remote control, it is possible for an eye for attaching an actuating cable to be provided in an end region of the pull lever. The actuating cable can, for example, run in the direction of a hinged rear window of a driver's cab of the agricultural tractor, allowing convenient actuation of the locking mechanism by the operator without leaving the driver's cab.

For the sake of completeness, it should be noted that it is also conceivable to bring the locking latch into the coupling position by power operation. For this purpose, an actuator in the form of a pneumatically or hydraulically controllable actuating cylinder, an electric-motor actuating drive or an electromagnetic actuator can be assigned to the locking mechanism.

BRIEF DESCRIPTION OF THE DRAWINGS

The coupling device according to the disclosure for a lower link of a three-point linkage is explained in more detail below with reference to the attached drawings. Here, identical reference signs relate to corresponding components or components which are comparable with respect to their function. In the drawings.

DETAILED DESCRIPTION

Figure 1:
FIG. 1 shows a sectional view of one example embodiment of the coupling device according to the disclosure with a locking latch, which is in a locking position, in which a catch hook is locked.

FIG. 1 shows one example embodiment of the coupling device according to the disclosure.

The coupling device 10 comprises a coupling body 12 with a catch hook 14 for receiving a coupling element 18 of complementary design to a fastening region 16 of the catch hook 14 along a receiving direction 20 defined by the opening path of the catch hook 14 in the fastening region 16. The coupling body 12, which is produced as a steel forging, is welded on in an end region 22 of a conventional lower link 24, which is part of a three-point linkage (not shown) of an agricultural tractor. To be more precise, the three-point linkage has left and right lower links 24, which run symmetrically with respect to one another and are each equipped with the coupling device 10 illustrated in FIG. 1.

According to the example, a coupling element 18 designed as a coupling ball 26 is situated in the fastening region 16, which coupling element 18 is surrounded by an attachment interface (not shown) of a tilling implement, such as a plough, a harrow or a sowing machine, or of a supported attachment in the form of a fertilizer spreader, a sprayer linkage or the like.

Furthermore, the coupling device 10 has a locking mechanism 28 with a locking latch 30 composed of hardened steel. The locking latch 30 is urged by the action of a spring force into a locking position 32, in which the catch hook 14 is locked, ensuring that the coupling ball 26 situated in the fastening region 16 is retained in the catch hook 14.

The locking latch 30 is mounted in a longitudinally movable manner in a sliding guide 34 provided on the coupling body 12 in such a way that it can be deflected out of the locking position 32 exclusively perpendicularly to the defined receiving direction 20, thereby clearing the fastening region 16. As can be seen in FIG. 1, the locking latch 30, which is in the locking position 32, projects more than half way beyond the fastening region 16 in the defined receiving direction 20, thereby performing a locking function. If, as here, the coupling element 18 is configured as a coupling ball 26, this means that the locking latch 30 extends beyond the apex 38, which faces the locking latch 30 in the receiving direction 20.

In addition, a concave contact contour 38, which faces the fastening region 16 and corresponds to an outer curvature of the coupling ball 26 situated in the fastening region 16, is formed on the locking latch 30. When the coupling ball 26 is in contact with the concave contact contour 38, pushing open of the locking latch 30 by the coupling ball 26 is blocked by the rising flank 40 of the concave contact contour 38.

Figure 2:
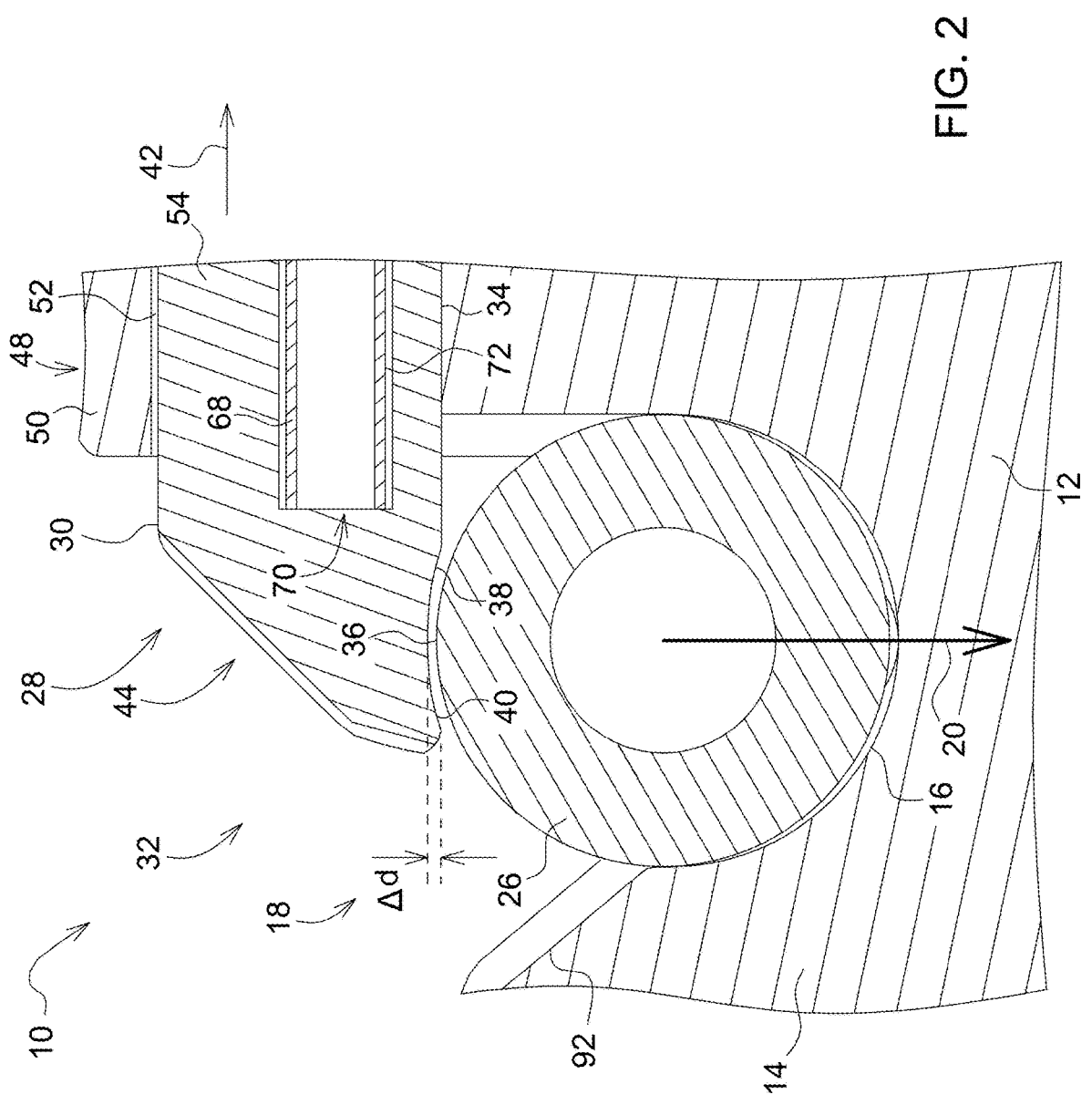
FIG. 2 shows a detail view of a coupling element in the form of a coupling ball situated in the catch hook.

In accordance with the detailed illustration in FIG. 2, the coupling ball 26 has a certain bearing play Δd within the fastening region 16. This is of the order of 2 to 3 millimeters. This makes possible contamination-tolerant "positive engagement" between the coupling ball 26 and the locking latch 30, which ensures problem-free opening and closing of the locking mechanism 28 even under adverse circumstances.

In an alternative embodiment (not shown) of the coupling device 10, the concave contact contour 38 is omitted, the locking latch 30 thus forming a flat contact contour which faces the fastening region 16 and runs parallel to the deflection direction 42 of the locking latch 30. As an option, a projection, which fits over the fastening region 16, can additionally be provided along the flat contact contour as a mechanical obstacle.

Figure 3:
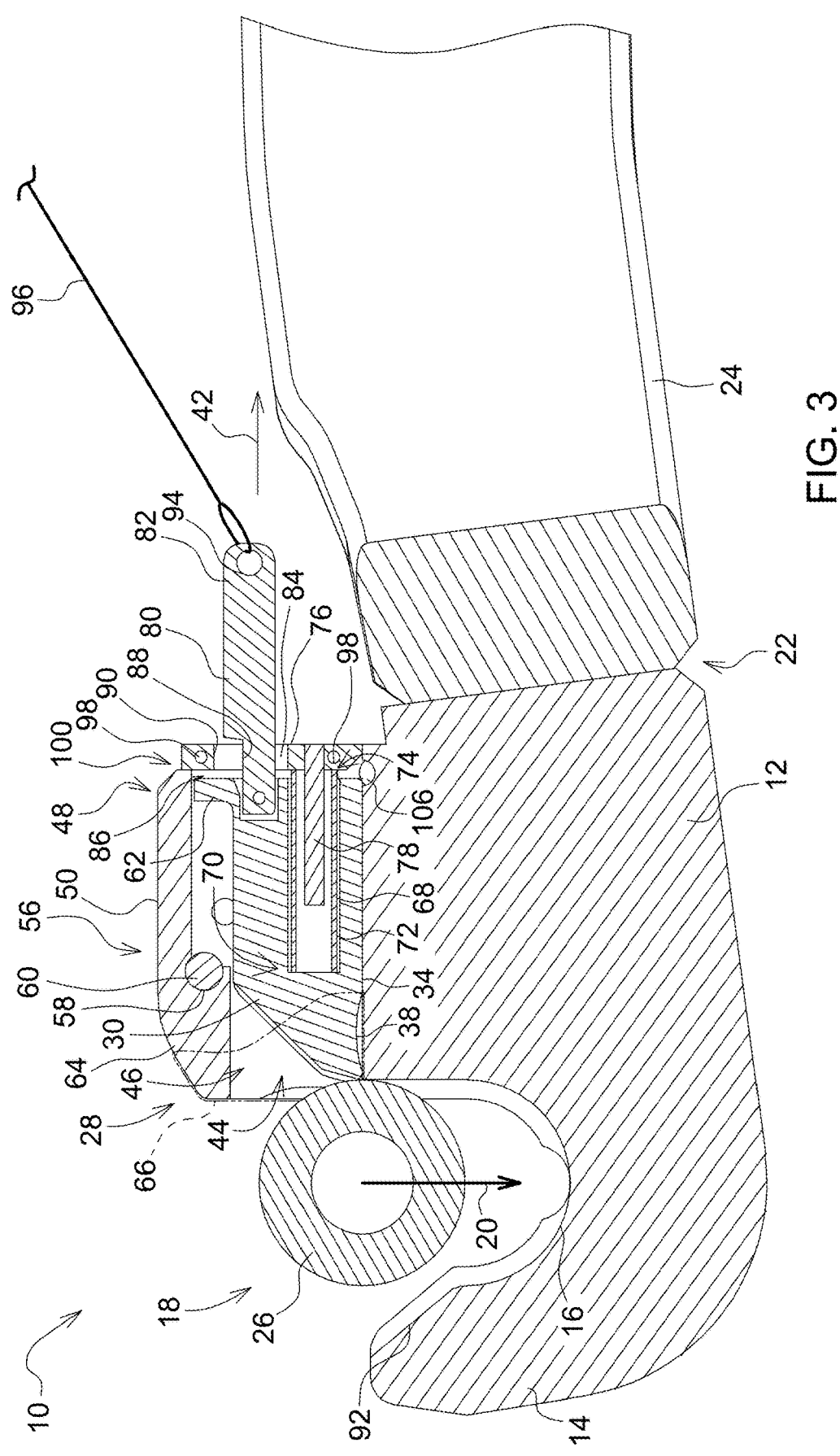
FIG. 3 shows the coupling device shown in FIG. 1, in which the locking latch is deflected into a coupling position which releases the catch hook.
Figure 4:
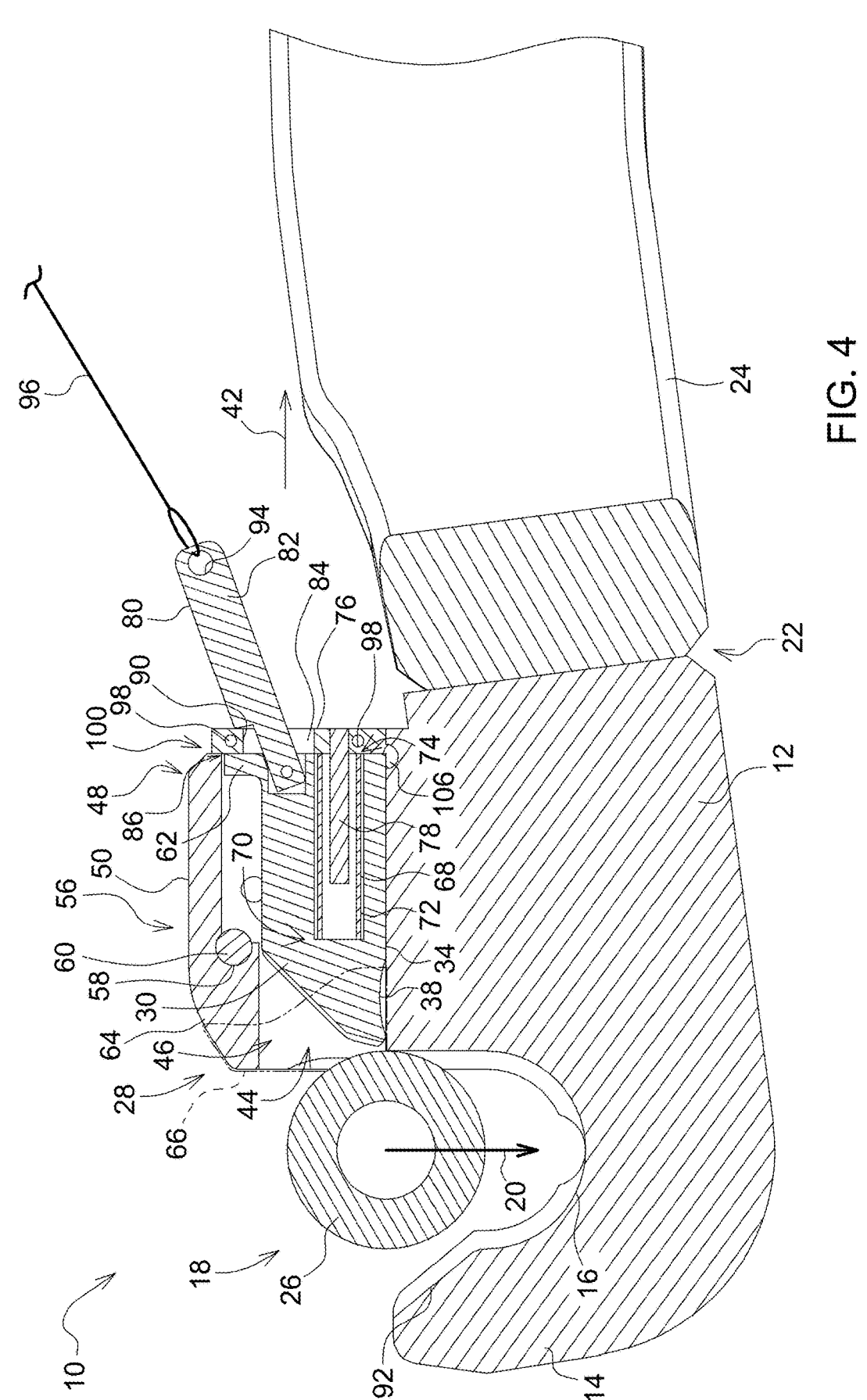
FIG. 4 shows the locking latch shown in FIG. 3, which is retained via a latching device in the coupling position, in which it releases the catch hook.

The locking latch 30 is bevelled in such a way at an end 44 lying in the receiving direction 20 that it is urged into a coupling position 46 which releases the catch hook 14 or clears the fastening region 16 when the coupling ball 26 is introduced. This state is shown in FIGS. 3 and 4. As soon as the coupling ball 26 has assumed its final position, the locking latch 30 automatically returns to its locking position 32 under the action of the restoring spring force. In this way, a snap lock is achieved, which makes it possible to carry out the coupling process with an attachment interface in a particularly convenient manner.

The sliding guide 34 is formed within a housing 50 provided on an upper side 48 of the coupling body 12. The sliding guide 34 is a shaft-shaped recess 52 extending in the housing 50, in which the locking latch 30 is guided in a longitudinally movable manner along a slide-shaped section 54.

As a protection against damage to the locking mechanism 28, the sliding guide 34 has an elastic stop element 56 for limiting a longitudinal movement of the locking latch 30 in the direction of the locking position 32. The elastic stop element 56 is an elastomer strip 60 inserted into an internal housing groove 58, against which strip the locking latch 30 bears in the locking position 32 via a projection 62 provided on the slide-shaped section 54. The compressibility of the elastomer strip 60 is dimensioned in such a way that it keeps the projection 62 out of contact with the adjacent housing section in the locking position 32. In this respect, the locking latch 30 is clamped or supported in a "floating" manner in the locking position 32 by the action of the restoring spring force.

The housing 50 has a box-shaped configuration and is an integral part of the coupling body 12. To be more precise, the integral design is limited to a housing shell 64 which is formed on the coupling body 12, is open to the side and is covered by welding on a separate housing cover 66.

The housing cover 66 is only indicated in part in FIGS. 1, 3 and 4 in order not to conceal the components of the locking mechanism 28 situated thereunder. Both the coupling body 12 and the housing 50 are produced as steel forgings.

As can be seen in the sectional view of FIG. 1, the spring force is built up via a helical compression spring 68, which is received with a first end 70 in a blind hole 72 formed on an inner side of the locking latch 30 and is supported with a second end 74 on a maintenance cover 76 of the housing 50. A guide rod 78, which is attached to the maintenance cover 76, runs within the compression spring 68 and ensures that the compression spring 68 is compressed without kinking when the locking latch 30 is moved in the direction of the coupling position 46.

Furthermore, a pull lever 80 is attached to the locking latch 30, via which the locking latch 30 can be deflected manually out of the locking position 32 by the operator. This operating state is reproduced in FIG. 3. For this purpose, the pull lever 80 or a hand piece 82 formed thereon extends outward through an outlet opening 84 provided in the maintenance cover 76.

A latching device 86, via which the locking latch 30 can be retained in the coupling position 46, is formed on the pull lever 80. The latching device 86 is a step-shaped recess 88 which is formed along the pull lever 80 and can be hooked in an edge 90 of the outlet opening 84 on the maintenance cover 76. This operating state is shown in FIG. 4.

Furthermore, the sequence of the coupling process can be seen in FIGS. 3 and 4 in that the coupling ball 26 is inserted into the catch hook 14 when the locking mechanism 28 is open. The catch hook 14 has a jaw-shaped receiving region 92 for centering the coupling ball 26, which region subsequently merges into the actual fastening region 16. As already mentioned, the coupling ball 26 is of complementary design to the fastening region 16, apart from a predetermined bearing play Δd. Owing to the opening path of the catch hook 14 in the fastening region 16, the coupling ball 26 is guided along the defined receiving direction 20.

In order to implement a simple type of remote control, an eye 94 with an actuating cable 96 attached thereto is provided in an end region of the pull lever 80. The actuating cable 96 runs in the direction of a hinged rear window of a driver's cab of the agricultural tractor, allowing convenient actuation of the locking mechanism 28 by the operator without leaving the driver's cab.

After the removal of a plurality of clamping sleeves 98, the maintenance cover 76 can be removed and in the process exposes a rear access opening 100, which makes it possible to replace the locking latch 30, together with further components of the locking mechanism 28, inter alia the compression spring 68, the pull lever 80 and the elastomer strip 60, in the event of wear or a defect. The locking mechanism 28 is situated in the housing 50 as an insert that can be pulled out along the sliding guide 34, and it can be removed as a whole through the access opening 100 when the maintenance cover 76 is removed.

Mutually aligned bores 102 for receiving a securing bolt (not shown) extend through opposing cheeks of the housing 50 in such a way that a deflection of the locking latch 30 out of the locking position 32 can be blocked via the securing bolt. When the securing bolt is inserted through the bores 102, it rests against the rear end 104 of the locking latch 30 and prevents it from moving out of the locking position 32. The securing bolt is usually a screw which, after being inserted, can be secured at its open end protruding from the housing 50 via a nut.

In addition, a drainage opening 106 for drainage of liquid is formed in the housing 50 to drain off water that penetrates into the locking mechanism 28.

The invention claimed is:

1. A coupling device for a lower link of a three-point linkage, comprising:

a coupling body with a catch hook for receiving a coupling element along a defined receiving direction, the coupling element being of complementary design to a fastening region of the catch hook;

a locking mechanism with a locking latch, which is urged by a spring force into a locking position, in which the catch hook is locked, in which case a coupling element to be received by the fastening region can be retained in the catch hook, the locking latch mounted in a longitudinally movable manner in a sliding guide, formed within a housing provided on an upper side of the coupling body, in such a way that it can be deflected out of the locking position exclusively perpendicularly to the defined receiving direction, thereby clearing the fastening region, whereas the locking latch, when in the locking position, projects more than half way beyond the fastening region in the defined receiving direction, thereby performing a locking function, and the spring force provided via a helical compression spring having a first end received in a blind hole on an inner side of the locking latch and a second end supported on a maintenance cover of the housing;

a concave contact contour on the locking latch facing the fastening region and corresponding to an outer curvature of the coupling element, and a rising flank of the concave contact contour blocking pushing open of the locking latch by the coupling element when the coupling element is in contact with the concave contact contour; and a guide rod attached to the maintenance cover running within the helical compression spring and ensuring that the helical compression spring is compressed without kinking when the locking latch is moved in the direction of a coupling position.

2. The coupling device of claim 1, wherein the locking latch is bevelled in such a way at an end lying in the receiving direction that it can be urged into a coupling position which clears the fastening region when the coupling element is introduced.

3. The coupling device of claim 1, wherein the housing has an access opening, which can be closed via a removable maintenance cover.

4. The coupling device of claim 1, wherein mutually aligned bores for receiving a securing bolt extend through opposing cheeks of the housing in such a way that a deflection of the locking latch out of the locking position can be blocked via the securing bolt.

5. The coupling device of claim 1, wherein a drainage opening for drainage of liquid is formed in the housing.

6. The coupling device of claim 1, wherein the sliding guide has an elastic stop element for limiting a longitudinal movement of the locking latch in the direction of the locking position.

7. The coupling device of claim 1, wherein a pull lever is attached to the locking latch, via which the locking latch can be deflected manually out of the locking position by an operator.

8. The coupling device of claim 7, wherein a latching device, via which the locking latch can be retained in a coupling position which clears the fastening region, is formed on the pull lever.

9. The coupling device of claim 7, wherein an eye for attaching an actuating cable is provided in an end region of the pull lever.

10. The coupling device of claim 1, wherein the locking latch is parallel to the sliding guide, which is parallel to the blind hole, which is parallel to the guide rod, which is parallel to the helical compression spring.

* * * * *